J. M. SUTTON & La F. PORTER.
Horse Hay Forks.
No. 151,519.
Patented June 2, 1874.
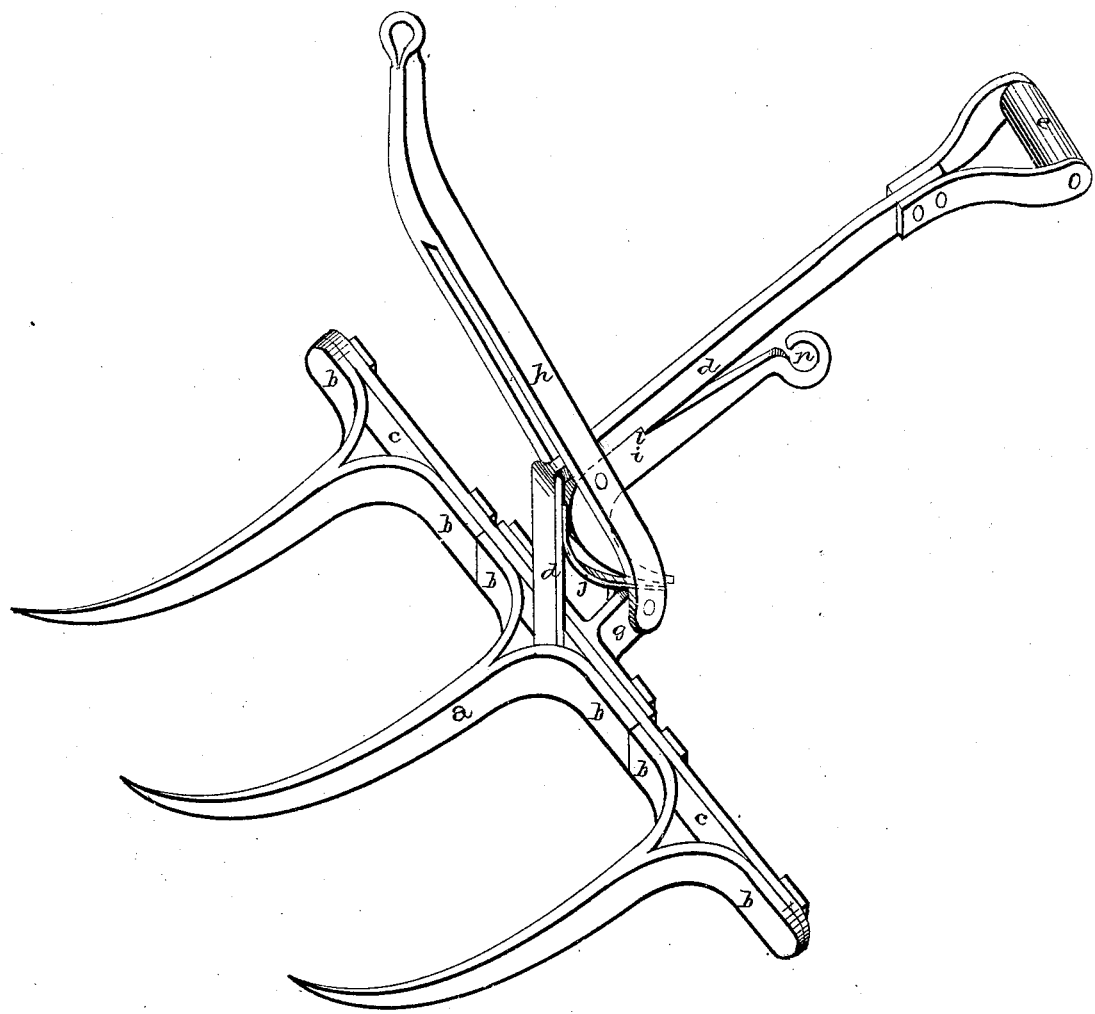

UNITED STATES PATENT OFFICE.

JOHN M. SUTTON AND LA FAYETTE PORTER, OF CONNEAUTVILLE, PA.

IMPROVEMENT IN HORSE HAY-FORKS.

Specification forming part of Letters Patent No. 151,519, dated June 2, 1874; application filed April 23, 1874.

*To all whom it may concern:*

Be it known that we, J. M. SUTTON and LA FAYETTE PORTER, of Conneautville, in the county of Crawford and State of Pennsylvania, have invented certain new and useful Improvements in Horse Hay-Forks; and we do hereby declare the following to be a full, clear, and exact description of the invention, such as will enable others skilled in the art to which it pertains to make and use it, reference being had to the accompanying drawings, which form part of this specification.

The nature of our invention relates to an improvement in horse hay-forks; and it consists in the arrangement and combination of parts, which will be more fully described hereafter, whereby the operation of the parts is simplified, their construction cheapened, and their efficiency greatly improved.

The accompanying drawings represent my invention.

$a$ represents the fork, provided with any number of suitably-curved prongs, each one of which has a head, $b$, formed upon its inner end, so that it can be attached to the head $c$ by means of bolts and nuts. In case one of them should be broken or injured, as often occurs, it can be readily removed and replaced or mended. The handle $d$, bent as shown, and having a handle, $e$, formed at its outer end, is secured to the head or cross-bar $c$ in the same manner. Projecting outward from the head $c$ is an ear or lug, $g$, by means of which the fork is pivoted to the lower end of the lifting-bar $h$, the pivot being placed on a level with the fork, so that when the load is dumped the movement of the fork will be short and quick, so as to drop it at once. By means of the handle $d\ e$ the fork can be held from twisting while the prongs are being forced in the hay with the foot, and the fork can be freely used for gathering up the scatterings of the hay, around and in the wagon, and for loading manure. The lifting-bar $h$ consists of two metal straps, having a ring or loop formed at its upper end, in which the pulley-rope is fastened, and which straps serve as a guide and stop to the movements of the handle $d$. Pivoted between these two straps is a dog, $i$, having its lower end somewhat curved and bent at right angles, so that it will bear down upon the flat spring $j$, fastened to the handle $d$. On the top of the dog is formed a shoulder or projection, $l$, which, when the fork is drawn down to a horizontal position, catches in a corresponding recess formed in the under side of the handle, and supports the load upon the fork. By pulling down upon the trip-rope, which is fastened to the ring $n$ on the end of the dog, the upward pressure of the spring $j$, which holds the dog in position, is overcome, the fork released, and the weight of the load at once causes the fork to drop. By placing the dog and spring under the handle they are out of the way, and the fork made much more compact and easily managed.

Having thus described my invention, I claim—

The combination of the fork $a$, handle $d$, lifting-bar $h$, dog $i\ l$, spring $j$, and ear $g$, the pivot of the fork being placed on a level with the prongs, substantially as specified.

In testimony that we claim the foregoing we have hereunto set our hands this 20th day of April, 1874.

JOHN MILLER SUTTON.
L. F. PORTER.

Witnesses:
CYRUS CARMAN,
H. TALCOTT.